US012729003B1

(12) United States Patent
Carpino, II et al.

(10) Patent No.: US 12,729,003 B1
(45) Date of Patent: Sep. 8, 2026

(54) NACELLE INLET NESTED THREE-PHASE ELECTROTHERMAL HEATER

(71) Applicant: Goodrich Corporation, Charlotte, NC (US)

(72) Inventors: Richard J. Carpino, II, Canton, OH (US); Sarah Marie Kassinger, Tallmadge, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 19/304,449

(22) Filed: Aug. 19, 2025

(51) Int. Cl.
*B64D 15/12* (2006.01)
*B64D 33/02* (2006.01)
*H05B 1/02* (2006.01)

(52) U.S. Cl.
CPC ............. *B64D 15/12* (2013.01); *B64D 33/02* (2013.01); *H05B 1/0236* (2013.01); *B64D 2033/0233* (2013.01); *B64D 2221/00* (2013.01); *H05B 2203/005* (2013.01); *H05B 2214/02* (2013.01)

(58) Field of Classification Search
CPC .................... B64D 15/12; B64D 33/02; B64D 2033/0233; B64D 2221/00; H05B 1/0236; H05B 2203/005; H05B 2214/02
See application file for complete search history.

(56) References Cited

U.S. PATENT DOCUMENTS 4,355,239 A * 10/1982 Williams .................. H02P 9/10 307/41
5,765,779 A 6/1998 Hancock et al.
7,922,121 B2 4/2011 Gaertner et al.
7,923,668 B2 4/2011 Layland et al.
8,575,900 B2 11/2013 Spierling et al.
8,975,560 B2 3/2015 Pereira et al.
9,038,363 B2 * 5/2015 Pereira .................. B64D 15/00 60/39.093
9,102,411 B2 8/2015 Pereira et al.
9,309,001 B2 * 4/2016 Calder .................. B64D 15/12
12,116,138 B2 10/2024 Danielson et al.
(Continued)

FOREIGN PATENT DOCUMENTS

EP 4198283 6/2023

OTHER PUBLICATIONS

Schneider et al. (GB Pub No. 2,449,651 A) Pub date Dec. 3, 2008 (Year: 2008).*

*Primary Examiner* — Rodney A Bonnette
(74) *Attorney, Agent, or Firm* — SNELL & WILMER L.L.P.

(57) ABSTRACT

A nested three-phase heater is disclosed herein. The nested three-phase heater includes a three-phase power supply, a set of three heating elements, and a controller. The set of three heating elements coupled to an aircraft part, each heating element of the set of three heating element coupled to a respective phase of the three-phase power supply. The controller is coupled to the three-phase power supply and the set of three heating elements. The controller is configured to control each of the phases of the three-phase power supply such that responsive to all heating elements of the set of three heating element being operational, the controller switches the phases to correspond to a respective predetermined time period in order that only two phases of the three-phase power supply are active and providing power during the predetermined time period.

20 Claims, 11 Drawing Sheets

(56) References Cited

U.S. PATENT DOCUMENTS

| | | | | |
|---|---|---|---|---|
| 2002/0079311 | A1 * | 6/2002 | Bulgajewski .......... | H05B 3/345 219/548 |
| 2004/0070898 | A1 * | 4/2004 | McMahon ........... | H02H 1/0015 361/42 |
| 2015/0292351 | A1 | 10/2015 | Pereira et al. | |

* cited by examiner

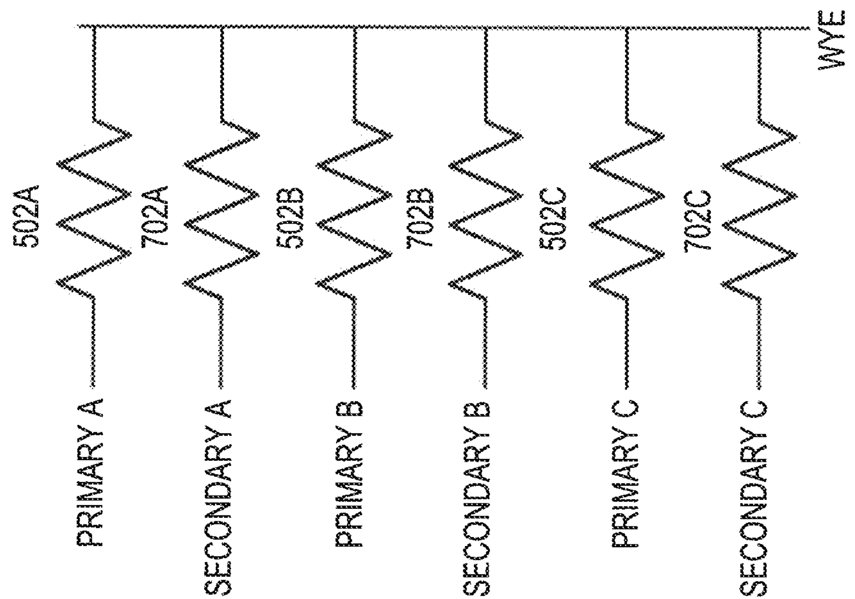
FIG.7
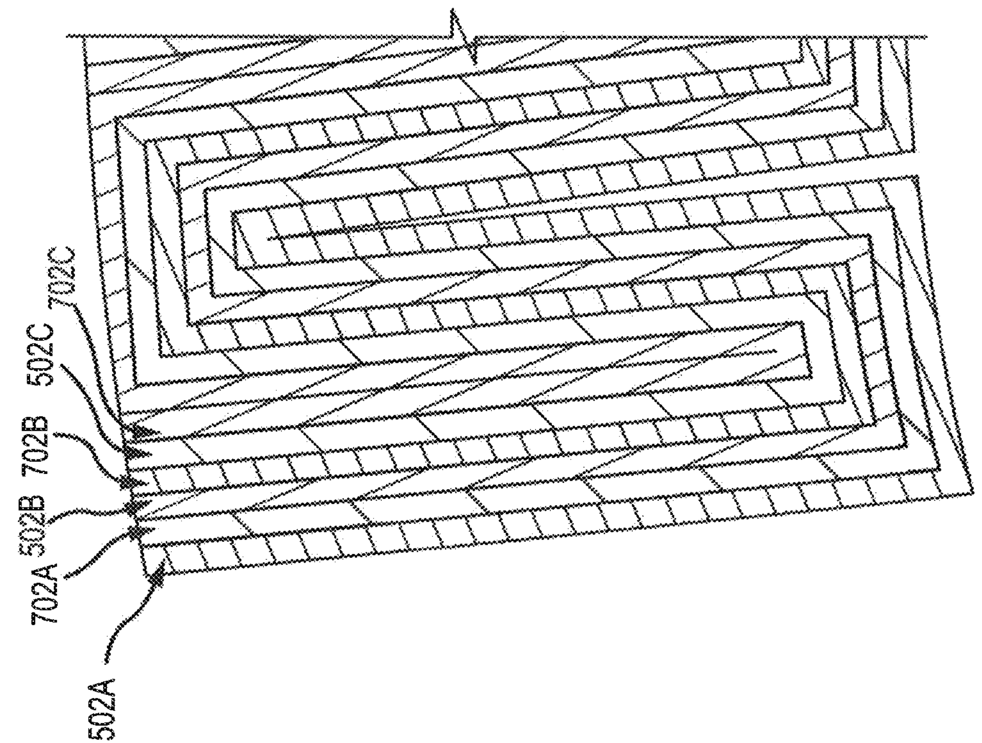

| | | | | 802 | | | 804 | | | 806 | |
|---|---|---|---|---|---|---|---|---|---|---|---|
| | | Power (W) | 200 ms | 200 ms | 200 ms | 200 ms | 200 ms | 200 ms | 200 ms | 200 ms | 200 ms |
| Quadrant 1 | Phase A (Q1) | 2500 | OFF | ON | ON | OFF | ON | ON | OFF | ON | ON |
| 302A | Phase B (Q1) | 2500 | ON | OFF | ON | ON | OFF | ON | ON | OFF | ON |
| | Phase C (Q1) | 2500 | ON | ON | OFF | ON | ON | OFF | ON | ON | OFF |
| Quadrant 2 | Phase A (Q2) | 2500 | ON | ON | OFF | ON | ON | OFF | ON | ON | OFF |
| 302B | Phase B (Q2) | 2500 | OFF | ON | ON | OFF | ON | ON | OFF | ON | ON |
| | Phase C (Q2) | 2500 | ON | OFF | ON | ON | OFF | ON | ON | OFF | ON |
| Quadrant 3 | Phase A (Q3) | 2500 | ON | OFF | ON | ON | OFF | ON | ON | OFF | ON |
| 302C | Phase B (Q3) | 2500 | ON | ON | OFF | ON | ON | OFF | ON | ON | OFF |
| | Phase C (Q3) | 2500 | OFF | ON | ON | OFF | ON | ON | OFF | ON | ON |
| Quadrant 4 | Phase A (Q4) | 2500 | OFF | ON | ON | OFF | ON | ON | OFF | ON | ON |
| 302D | Phase B (Q4) | 2500 | ON | OFF | ON | ON | OFF | ON | ON | OFF | ON |
| | Phase C (Q4) | 2500 | ON | ON | OFF | ON | ON | OFF | ON | ON | OFF |
| **Total Consumable Power (W) =** | | **30000** | | | | | | | | | |
| **Total Instantaneous Power (W) Draw per time step =** | | | 20000 | 20000 | 20000 | 20000 | 20000 | 20000 | 20000 | 20000 | 20000 |
| Phase A Power (W) per time step = | | | 5000 | 7500 | 7500 | 5000 | 7500 | 7500 | 5000 | 7500 | 7500 |
| Phase B Power (W) per time step = | | | 7500 | 5000 | 7500 | 7500 | 5000 | 7500 | 7500 | 5000 | 7500 |
| Phase C Power (W) per time step = | | | 7500 | 7500 | 5000 | 7500 | 7500 | 5000 | 7500 | 7500 | 5000 |

| | | Power (W) | 200 ms | 200 ms | 200 ms | 200 ms | 200 ms | 200 ms | 200 ms | 200 ms | 200 ms |
|---|---|---|---|---|---|---|---|---|---|---|---|
| Quadrant 1 | Phase A (Q1) | 2500 | OFF | ON | OFF | OFF | ON | ON | OFF | ON | ON |
| 302A | Phase B (Q1) | 2500 | ON | OFF | ON | ON | ON | ON | ON | OFF | ON |
| | Phase C (Q1) | 2500 | ON | ON | ON | ON | OFF | OFF | ON | ON | OFF |
| Quadrant 2 | Phase A (Q2) | 2500 | ON | ON | ON | ON | ON | ON | ON | ON | ON |
| 302B | Phase B (Q2) | 2500 | OFF | OFF | OFF | OFF | OFF | OFF | OFF | OFF | OFF |
| | Phase C (Q2) | 2500 | ON | ON | ON | ON | ON | ON | ON | ON | ON |
| Quadrant 3 | Phase A (Q3) | 2500 | ON | OFF | ON | ON | OFF | ON | ON | OFF | OFF |
| 302C | Phase B (Q3) | 2500 | ON | ON | OFF | ON | ON | OFF | ON | ON | ON |
| | Phase C (Q3) | 2500 | OFF | ON | ON | OFF | ON | ON | OFF | ON | ON |
| Quadrant 4 | Phase A (Q4) | 2500 | OFF | ON | ON | OFF | ON | OFF | OFF | ON | ON |
| 302D | Phase B (Q4) | 2500 | ON | ON | ON | ON | OFF | ON | ON | ON | ON |
| | Phase C (Q4) | 2500 | ON | OFF | OFF | ON | ON | ON | ON | OFF | OFF |
| **Total Consumable Power (W) =** | | **30000** | | | | | | | | | |
| **Total Instantaneous Power (W) Draw per time step =** | | | 20000 | 20000 | 20000 | 20000 | 20000 | 20000 | 20000 | 20000 | 20000 |
| Phase A Power (W) per time step = | | | 5000 | 7500 | 7500 | 5000 | 7500 | 7500 | 5000 | 7500 | 7500 |
| Phase B Power (W) per time step = | | | 7500 | 5000 | 5000 | 7500 | 5000 | 5000 | 7500 | 5000 | 7500 |
| Phase C Power (W) per time step = | | | 7500 | 7500 | 7500 | 7500 | 7500 | 7500 | 7500 | 7500 | 5000 |

| | | Power (W) | 200 ms | 200 ms | 200 ms | 200 ms | 200 ms | 200 ms | 200 ms | 200 ms | 200 ms |
|---|---|---|---|---|---|---|---|---|---|---|---|
| Quadrant 1 | Phase A (Q1) | 2500 | OFF | OFF | OFF | OFF | OFF | OFF | OFF | OFF | OFF |
| 302A | Phase B (Q1) | 2500 | ON | ON | ON | ON | ON | ON | ON | ON | ON |
| | Phase C (Q1) | 2500 | ON | ON | ON | ON | ON | ON | ON | ON | ON |
| Quadrant 2 | Phase A (Q2) | 2500 | ON | ON | ON | ON | ON | ON | ON | ON | ON |
| 302B | Phase B (Q2) | 2500 | OFF | OFF | OFF | OFF | OFF | OFF | OFF | OFF | OFF |
| | Phase C (Q2) | 2500 | ON | ON | ON | ON | ON | ON | ON | ON | ON |
| Quadrant 3 | Phase A (Q3) | 2500 | ON | OFF | ON | ON | ON | ON | ON | OFF | ON |
| 302C | Phase B (Q3) | 2500 | ON | ON | OFF | ON | ON | OFF | ON | ON | OFF |
| | Phase C (Q3) | 2500 | OFF | ON | ON | OFF | OFF | ON | OFF | ON | ON |
| Quadrant 4 | Phase A (Q4) | 2500 | OFF | ON | ON | OFF | ON | ON | OFF | ON | ON |
| 302D | Phase B (Q4) | 2500 | ON | ON | ON | ON | OFF | ON | ON | ON | ON |
| | Phase C (Q4) | 2500 | ON | OFF | OFF | ON | ON | OFF | ON | OFF | OFF |
| **Total Consumable Power (W) =** | | **30000** | | | | | | | | | |
| **Total Instantaneous Power (W) Draw per time step =** | | | 20000 | 20000 | 20000 | 20000 | 20000 | 20000 | 20000 | 20000 | 20000 |
| Phase A Power (W) per time step = | | | 5000 | 5000 | 7500 | 5000 | 7500 | 7500 | 5000 | 5000 | 7500 |
| Phase B Power (W) per time step = | | | 7500 | 7500 | 5000 | 7500 | 5000 | 5000 | 7500 | 7500 | 5000 |
| Phase C Power (W) per time step = | | | 7500 | 7500 | 7500 | 7500 | 7500 | 7500 | 7500 | 7500 | 7500 |

| | | Power (W) | 200 ms | 200 ms | 200 ms | 200 ms | 200 ms | 200 ms | 200 ms | 200 ms | 200 ms |
|---|---|---|---|---|---|---|---|---|---|---|---|
| Quadrant 1 | Phase A (Q1) | 2500 | OFF | OFF | OFF | OFF | OFF | OFF | OFF | OFF | OFF |
| 302A | Phase B (Q1) | 2500 | ON | ON | ON | ON | ON | ON | ON | ON | ON |
| | Phase C (Q1) | 2500 | ON | ON | ON | ON | ON | ON | ON | ON | ON |
| Quadrant 2 | Phase A (Q2) | 2500 | ON | ON | ON | ON | ON | ON | ON | ON | ON |
| 302B | Phase B (Q2) | 2500 | OFF | OFF | OFF | OFF | OFF | OFF | OFF | OFF | OFF |
| | Phase C (Q2) | 2500 | ON | ON | ON | ON | ON | ON | ON | ON | ON |
| Quadrant 3 | Phase A (Q3) | 2500 | ON | ON | ON | ON | ON | ON | ON | ON | ON |
| 302C | Phase B (Q3) | 2500 | ON | ON | ON | ON | ON | ON | ON | ON | ON |
| | Phase C (Q3) | 2500 | OFF | OFF | OFF | OFF | OFF | OFF | OFF | OFF | OFF |
| Quadrant 4 | Phase A (Q4) | 2500 | OFF | ON | ON | OFF | ON | ON | OFF | ON | ON |
| 302D | Phase B (Q4) | 2500 | ON | OFF | ON | ON | OFF | ON | ON | OFF | ON |
| | Phase C (Q4) | 2500 | ON | ON | OFF | ON | ON | OFF | ON | ON | OFF |
| **Total Consumable Power (W) =** | | **30000** | | | | | | | | | |
| **Total Instantaneous Power (W) Draw per time step =** | | | 20000 | 20000 | 20000 | 20000 | 20000 | 20000 | 20000 | 20000 | 20000 |
| Phase A Power (W) per time step = | | | 5000 | 7500 | 7500 | 5000 | 7500 | 7500 | 5000 | 7500 | 7500 |
| Phase B Power (W) per time step = | | | 7500 | 5000 | 7500 | 7500 | 5000 | 7500 | 7500 | 5000 | 7500 |
| Phase C Power (W) per time step = | | | 7500 | 7500 | 5000 | 7500 | 7500 | 5000 | 7500 | 7500 | 5000 |

FIG.11

NACELLE INLET NESTED THREE-PHASE ELECTROTHERMAL HEATER

FIELD

The present disclosure generally relates to systems for anti-icing systems for aircraft parts, and more specifically, to a nacelle inlet nested three-phase electrothermal heater.

BACKGROUND

Various aircraft parts (such as a nacelle, a wing, or the like) may be subjected to relatively cold temperatures (e.g., below freezing) and moisture. This combination may result in ice formation on the parts. Electrothermal anti-ice heaters are typically installed on or in such parts to reduce or prevent the collection of ice while also limiting internal structure temperatures below structural material temperature limits.

SUMMARY

A nested three-phase heater for an aircraft part is disclosed herein. The nested three-phase heater includes a three-phase power supply, a set of three heating elements, and a controller. Each heating element of the set of three heating elements is coupled to a respective phase of the three-phase power supply. The controller is coupled to the three-phase power supply and the set of three heating elements, The controller is configured to control each of the phases of the three-phase power supply. The controller is further configured to, responsive to all heating elements of the set of three heating elements being operational, switch the phases such that: for a first predetermined time period, activate and provide power from a first phase and a second phase of the three-phase power supply to a first heating element and a second heating element of the set of three heating elements, respectively; for a second predetermined time period, activate and provide power from the second phase and a third phase of the three-phase power supply to the second heating element and a third heating element of the set of three heating elements, respectively; and, for a third predetermined time period, activate and provide power from the first phase and the third phase of the three-phase power supply to the first heating element and the third heating element of the set of three heating elements, respectively.

In various embodiments, the controller is further configured to, responsive to at least one of one heating element of the set of three heating elements failing, a phase of the three-phase power supply supplying power to the one heating element failing, or wiring between the three-phase power supply and the one heating element failing, activate and provide power from respective phases of the three-phase power supply to the other two heating elements of the set of three heating elements.

In various embodiments, the aircraft part is an inlet cowl.

In various embodiments, the nested three-phase heater is coupled to the inlet cowl.

In various embodiments, the nested three-phase heater is coupled to the inlet cowl, extending an outward distance from a leading edge of the inlet cowl outward along an outer portion of the inlet cowl and extending an inner distance from the leading edge of the inlet cowl inward along an inner portion of the inlet cowl.

In various embodiments, the set of three heating elements wind back and forth between the outer portion of the inlet cowl to the inner portion of the inlet cowl.

In various embodiments, in the nested three-phase heater, the first heating element is adjacent the second heating element, and the second heating element is adjacent the third heating element.

In various embodiments, the nested three-phase heater is a first three-phase electrothermal heater and the set of three heating elements is a first set of three heating elements. In various embodiments, the nested three-phase heater further includes: a second three-phase electrothermal heater comprising a second set of three heating elements coupled to the aircraft part, each heating element of the second set of three heating elements coupled to a respective phase of the three-phase power supply. In various embodiments, the controller is configured to, responsive to all heating elements of the second set of three heating elements being operational, switch the phases such that: for the first predetermined time period, activate and provide power from the first phase and the second phase of the three-phase power supply to a first heating element and a second heating element of the second set of three heating elements, respectively; for the second predetermined time period, activate and provide power from the second phase and the third phase of the three-phase power supply to the second heating element and a third heating element of the second set of three heating elements, respectively; and for the third predetermined time period, activate and provide power from the first phase and the third phase of the three-phase power supply to the first heating element and the third heating element of the second set of three heating elements, respectively.

In various embodiments, the second three-phase electrothermal heater is nested within the first three-phase electrothermal heater such that the third heating element of the first three-phase electrothermal heater is adjacent the first heating element of the second three-phase electrothermal heater, the first heating element of the second three-phase electrothermal heater is adjacent the second heating element of the second three-phase electrothermal heater, and the second heating element of the second three-phase electrothermal heater is adjacent the third heating element of the second three-phase electrothermal heater.

In various embodiments, the three-phase power supply is a first three-phase power supply. In various embodiments, the nested three-phase heater further includes: a second three-phase power supply. In various embodiments, the second three-phase electrothermal heater is coupled to the second three-phase power supply. In various embodiments, the second three-phase electrothermal heater is nested within the first three-phase electrothermal heater such that the first heating element of the first three-phase electrothermal heater is adjacent the first heating element of the second three-phase electrothermal heater, the second heating element of the first three-phase electrothermal heater is adjacent the first heating element of the second three-phase electrothermal heater, the second heating element of the second three-phase electrothermal heater is adjacent the second heating element of the first three-phase electrothermal heater, the third heating element of the first three-phase electrothermal heater is adjacent the second heating element of the second three-phase electrothermal heater, and the third heating element of the second three-phase electrothermal heater is adjacent the third heating element of the first three-phase electrothermal heater.

Also disclosed herein is a system. The system includes a surface of an aircraft, a three-phase power supply, a nested three-phase heater, and a controller. The nested three-phase heater is coupled to the surface of the aircraft and includes a set of three heating elements. Each heating element of the set of three heating elements is coupled to a respective phase of the three-phase power supply. The controller is coupled to the three-phase power supply and the nested three-phase heater. The controller is configured to control each of the phases of the three-phase power supply. The controller is configured to, responsive to all heating elements of the set of three heating elements being operational, switch the phases such that: for a first predetermined time period, activate and provide power from a first phase and a second phase of the three-phase power supply to a first heating element and a second heating element of the set of three heating elements, respectively; for a second predetermined time period, activate and provide power from the second phase and a third phase of the three-phase power supply to the second heating element and a third heating element of the set of three heating elements, respectively; and for a third predetermined time period, activate and provide power from the first phase and the third phase of the three-phase power supply to the first heating element and the third heating element of the set of three heating elements, respectively.

In various embodiments, the controller is further configured to, responsive to at least one of one heating element of the set of three heating elements failing, a phase of the three-phase power supply supplying power to the one heating element failing, or wiring between the three-phase power supply and the one heating element failing, activate and provide power from respective phases of the three-phase power supply to the other two heating elements of the set of three heating elements.

In various embodiments, the surface of the aircraft includes an inlet cowl. In various embodiments, the nested three-phase heater is coupled to the inlet cowl.

In various embodiments, the nested three-phase heater is coupled to the inlet cowl, extending an outward distance from a leading edge of the inlet cowl outward along an outer portion of the inlet cowl and extending an inner distance from the leading edge of the inlet cowl inward along an inner portion of the inlet cowl.

In various embodiments, the set of three heating elements wind back and forth between the outer portion of the inlet cowl to the inner portion of the inlet cowl.

In various embodiments, in the nested three-phase heater, the first heating element is adjacent the second heating element and the second heating element is adjacent the third heating element.

In various embodiments, the nested three-phase heater is a first three-phase electrothermal heater and the set of three heating elements is a first set of three heating elements. In various embodiments, the system further includes: a second three-phase electrothermal heater including a second set of three heating elements coupled to the surface of the aircraft, each heating element of the second set of three heating elements coupled to a respective phase of the three-phase power supply.

In various embodiments, the controller is configured to, responsive to all heating elements of the second set of three heating elements being operational, switch the phases such that: for the first predetermined time period, activate and provide power from the first phase and the second phase of the three-phase power supply to a first heating element and a second heating element of the second set of three heating elements, respectively; for the second predetermined time period, activate and provide power from the second phase and the third phase of the three-phase power supply to the second heating element and a third heating element of the second set of three heating elements, respectively; and for the third predetermined time period, activate and provide power from the first phase and the third phase of the three-phase power supply to the first heating element and the third heating element of the second set of three heating elements, respectively.

In various embodiments, the second three-phase electrothermal heater is nested within the first three-phase electrothermal heater such that the third heating element of the first three-phase electrothermal heater is adjacent the first heating element of the second three-phase electrothermal heater, the first heating element of the second three-phase electrothermal heater is adjacent the second heating element of the second three-phase electrothermal heater, and the second heating element of the second three-phase electrothermal heater is adjacent the third heating element of the second three-phase electrothermal heater.

In various embodiments, the three-phase power supply is a first three-phase power supply. In various embodiments, the system further includes: a second three-phase power supply. In various embodiments, the second three-phase electrothermal heater is coupled to the second three-phase power supply. In various embodiments, the second three-phase electrothermal heater is nested within the first three-phase electrothermal heater such that the first heating element of the first three-phase electrothermal heater is adjacent the first heating element of the second three-phase electrothermal heater, the second heating element of the first three-phase electrothermal heater is adjacent the first heating element of the second three-phase electrothermal heater, the second heating element of the second three-phase electrothermal heater is adjacent the second heating element of the first three-phase electrothermal heater, the third heating element of the first three-phase electrothermal heater is adjacent the second heating element of the second three-phase electrothermal heater, and the third heating element of the second three-phase electrothermal heater is adjacent the third heating element of the first three-phase electrothermal heater.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 7 illustrates an exploded view of a portion of one quadrant of a nacelle inlet nested three-phase electrothermal heater with a "dual" three-phase power source, in accordance with various embodiments.

FIGS. 8, 9, 10, and 11 illustrate tables for three consecutive sets of time periods, each set having a first predetermined time period, a second predetermined time period, and a third predetermined time period, under various conditions, in accordance with various embodiments.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that electrical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Electrothermal anti-ice heaters are typically installed on or in parts to reduce or prevent the collection of ice while also limiting internal structure temperatures below structural material temperature limits. However, electrothermal anti-ice heaters are typically a single point failure item in an ice protection system. While in typical ice protection systems, a redundant heater layer is often considered, such redundant ice protection systems add cost and weight to the aircraft. Accordingly, in the various embodiments described hereafter, a single-layer heater element is provided that is driven by three-phase power and designed such that, responsive to a single phase of the single-layer heater element failing, adequate ice protection is still provided. In that regard, in various embodiments, a nested (intertwined) three-phase heater element is provided that provides for even heat distribution even if a single phase fails.

Figure 1:
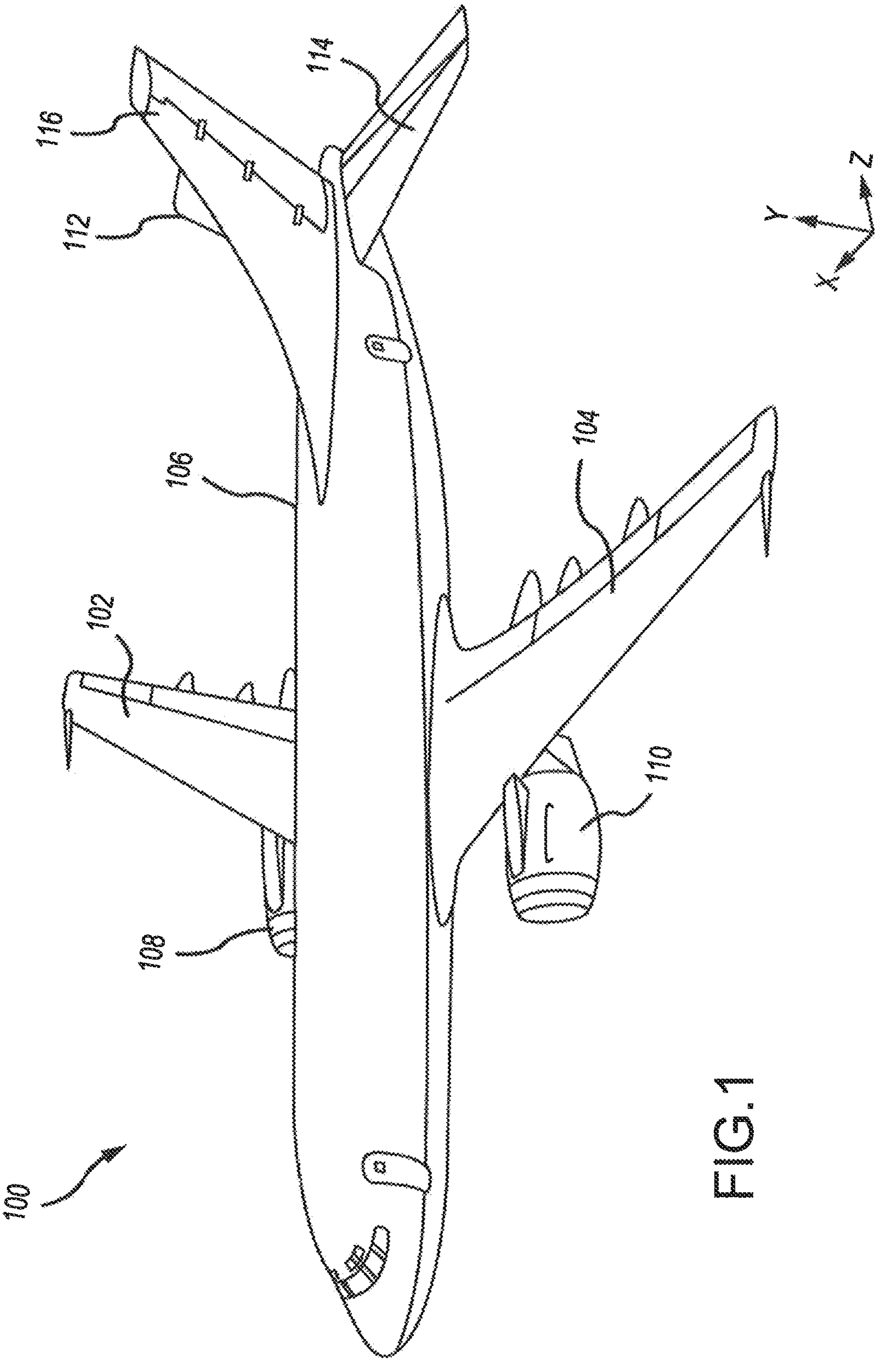
FIG. 1 illustrates an aircraft and various sections within the aircraft, in accordance with various embodiments.

Referring now to FIG. 1, an aircraft 100 and various sections within the aircraft is illustrated, in accordance with various embodiments. Aircraft 100 is an example of a passenger or transport vehicle in which a nacelle inlet nested three-phase electrothermal heater may be implemented in accordance with various embodiments. In various embodiments, aircraft 100 has a right wing 102 and a left wing 104 attached to a fuselage 106. In various embodiments, aircraft 100 also includes a right engine 108 connected to right wing 102 and a left engine 110 connected to left wing 104. In various embodiments, aircraft 100 also includes a right horizontal stabilizer 112, a left horizontal stabilizer 114, and a vertical stabilizer 116.

Figure 2:
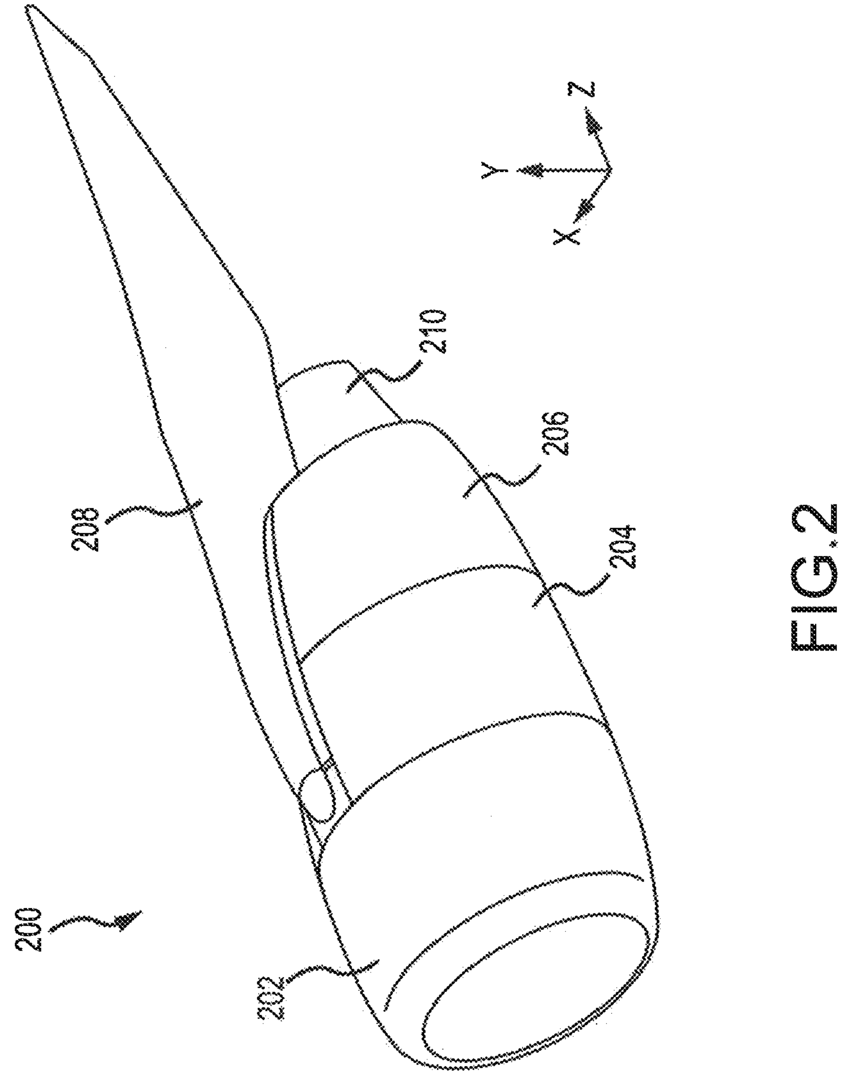
FIG. 2 illustrates a nacelle for a gas turbine engine, in accordance with various embodiments.

Referring now to FIG. 2, a nacelle 200 for a gas turbine engine, such as the right engine 108 or the left engine 110 of FIG. 1, is illustrated, in accordance with various embodiments. Nacelle 200 may comprise an inlet cowl 202, a fan cowl 204, and a thrust reverser 206. Nacelle 200 may be coupled to a pylon 208. Pylon 208 may mount the nacelle 200, and a gas turbine engine located within nacelle 200, to an aircraft wing or aircraft body. In various embodiments, an exhaust system 210 may extend from the gas turbine engine mounted within nacelle 200.

Figure 3:
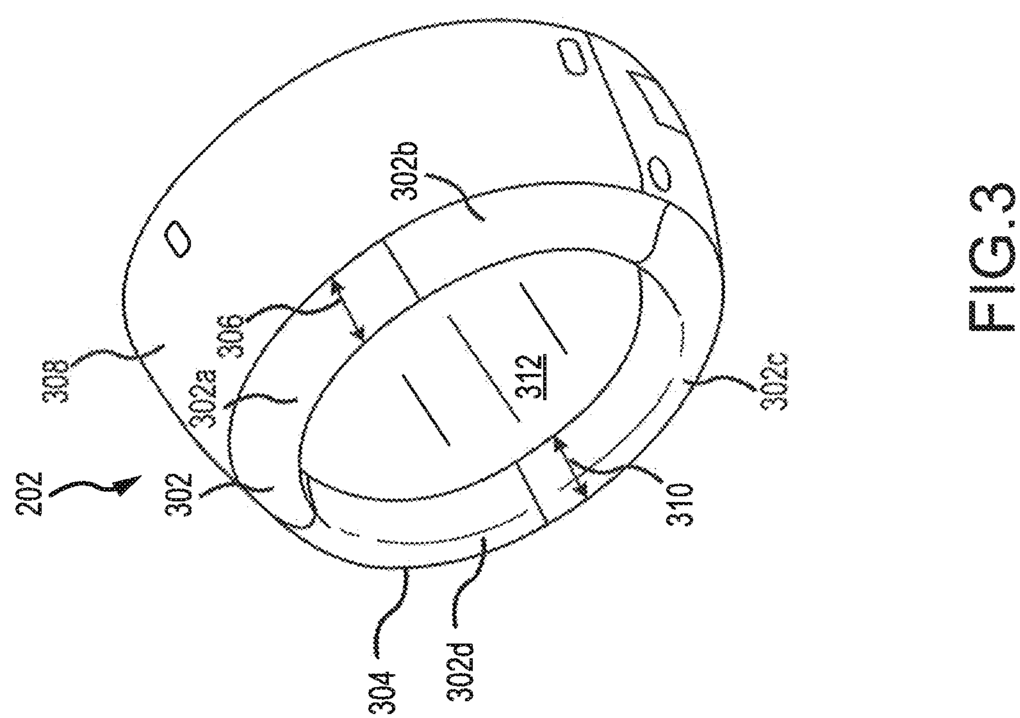
FIG. 3 illustrates an inlet cowl of a nacelle, in accordance with various embodiments.

Referring now to FIG. 3, an inlet cowl 202 of a nacelle, such as the nacelle 200 of FIG. 2, is illustrated, in accordance with various embodiments. In various embodiments, a nacelle inlet nested three-phase electrothermal heater 302 may be coupled to a leading edge 304 of the inlet cowl 202, extending an outward distance 306 from the leading edge 304 of the inlet cowl 202 outward along an outer portion 308 of the inlet cowl 202 and extending an inner distance 310 from the leading edge 304 of the inlet cowl 202 inward along an inner portion 312 of the inlet cowl 202. In various embodiments, the nacelle inlet nested three-phase electrothermal heater 302 may be divided into quadrants 302*a*, 302*b*, 302*c*, and 302*d*.

Figure 4:
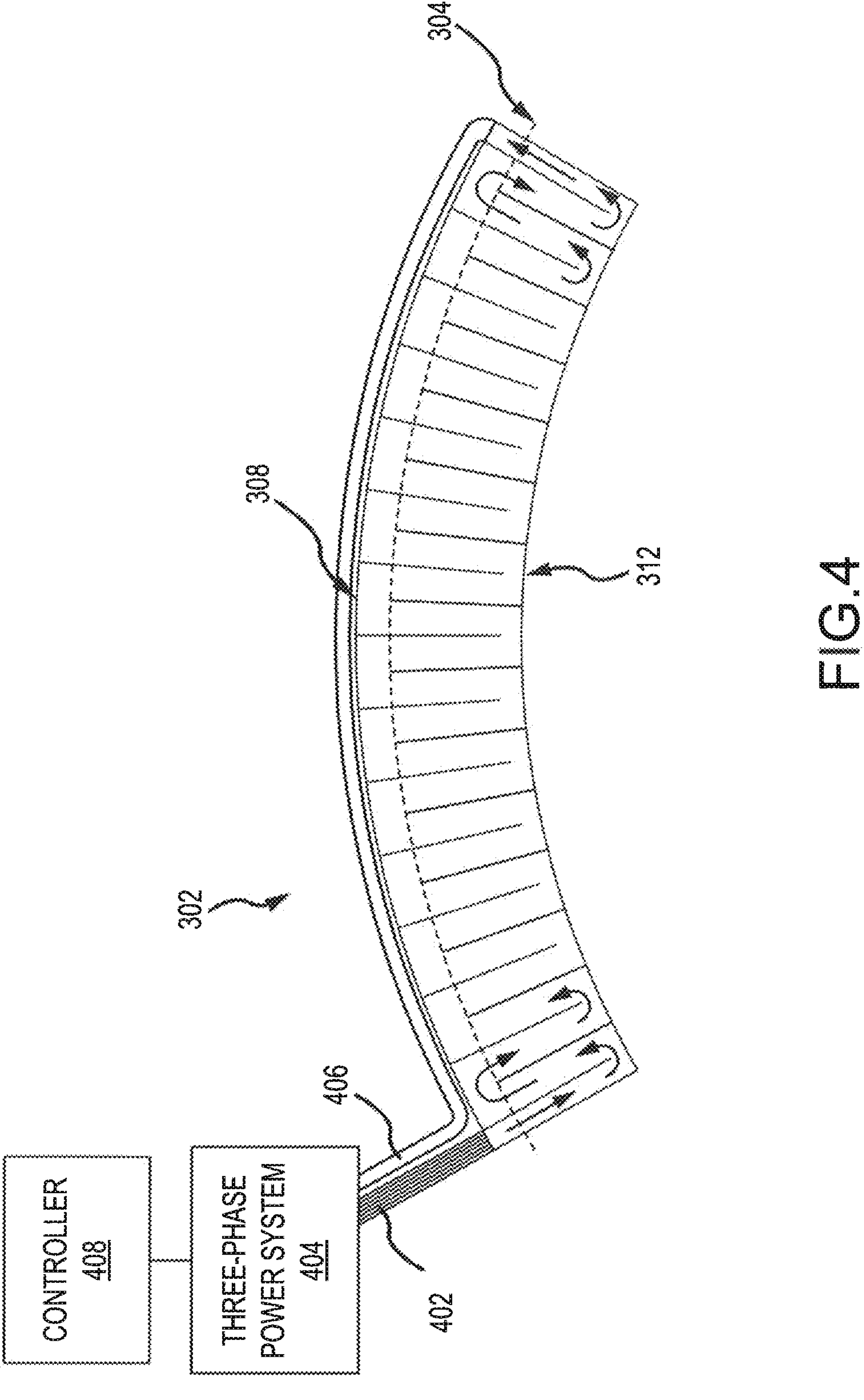
FIG. 4 illustrates a flat-pattern geometry of one quadrant of a nacelle inlet nested three-phase electrothermal heater system, in accordance with various embodiments.

Referring now to FIG. 4, a flat-pattern geometry of one quadrant of a nacelle inlet nested three-phase electrothermal heater system, such as nacelle inlet nested three-phase electrothermal heater 302 of FIG. 3, is illustrated, in accordance with various embodiments. In various embodiments, the one quadrant of a nacelle inlet nested three-phase electrothermal heater may be one of quadrants 302*a*, 302*b*, 302*c*, and 302*d* of FIG. 3. As described with regard to FIG. 3, in various embodiments, the nacelle inlet nested three-phase electrothermal heater 302 extends an outward distance from the leading edge 304 of the inlet cowl outward along an outer portion 308 of the inlet cowl and extending an inner distance from the leading edge 304 of the inlet cowl inward along an inner portion 312 of the inlet cowl. In various embodiments, the nacelle inlet nested three-phase electrothermal heater 302 includes a three-phase power input 402 from a three-phase power system 404 of the aircraft that provides three-phase power though the heating elements of nacelle inlet nested three-phase electrothermal heater 302. As is illustrated, in various embodiments, the heating elements wind back and forth between the outer portion 308 of the inlet cowl to the inner portion 312 of the inlet cowl from one end of the quadrant to the other end of the quadrant. In that regard, in various embodiments, the three-phase power from the three-phase power system 404 passes through the heating elements from the three-phase power input 402 to a wye return 406 back to the three-phase power system 404.

In various embodiments, the nacelle inlet nested three-phase electrothermal heater 302 is configured to operate at 66% max duty cycle responsive to all heating elements of a given quadrant of the nacelle inlet nested three-phase electrothermal heater 302 being operational. In that regard, in various embodiments, controller 408 is configured to, at a given time and responsive to all heating elements of the nacelle inlet nested three-phase electrothermal heater 302 being operational, control the three-phase power system 404 such that only two of the three heating elements within the nacelle inlet nested three-phase electrothermal heater 302 are receiving power from the three-phase power system 404. In that regard, in various embodiments, the controller 408 controls the switching, i.e., on or off, of the phases using pulse width modulation, such that, for example, phase A and B are on for a first predetermined time period, then, once the first predetermined time period ends, phase A is turned off and phase C is turned on for a second predetermined time period, then, once the second predetermined time period ends, phase B is turned off and phase A is turned back on for a third predetermined time period, with the operation repeating thereafter. In various embodiments, the first predetermined time period, the second predetermined time period, and the third predetermined time period may be the same. In various embodiments, the first predetermined time period, the second predetermined time period, and the third predetermined time period may be different. In various embodiments, the first predetermined time period, the second predetermined time period, and the third predetermined time period may be between 1 millisecond and 5 seconds. In various embodiments, the first predetermined time period, the second predetermined time period, and the third predetermined time period may be between 100 milliseconds and 300 milliseconds. In various embodiments, the first predetermined time period, the second predetermined time period, and the third predetermined time period may be 200 milliseconds. However, in various embodiments, responsive to a heating element of the heating elements of the nacelle inlet nested three-phase electrothermal heater 302 failing, a failed phase of the three-phase power supply, or failed wiring between the three-phase power supply and a respective heater element, for example, phase B, controller 408 is configured to control phase A and C such that phase A and C operate at a 100% duty cycle. Thus, the described design of the nacelle inlet nested three-phase electrothermal heater system provides for a power level 50% higher than would be otherwise used so that nacelle inlet nested three-phase electrothermal heater system may achieve the necessary ice protection surface temperature using a 66% duty cycle with all heating elements active and achieve the same surface temperature running a 100% duty cycle for the given quadrant when a heating element fails.

Figure 5:
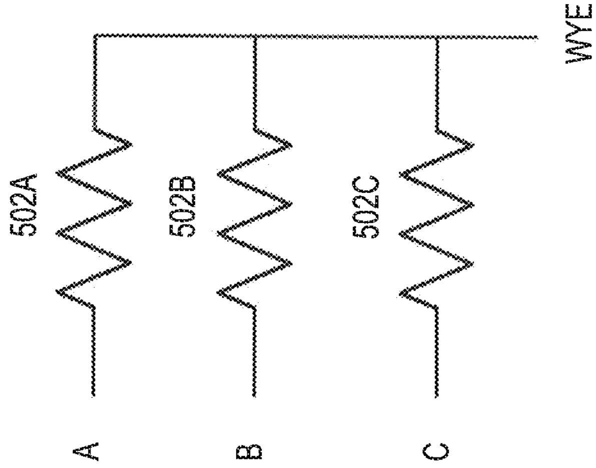
FIG. 5 illustrates an exploded view of a portion of one quadrant of a nacelle inlet nested three-phase electrothermal heater, in accordance with various embodiments.
Figure 5:
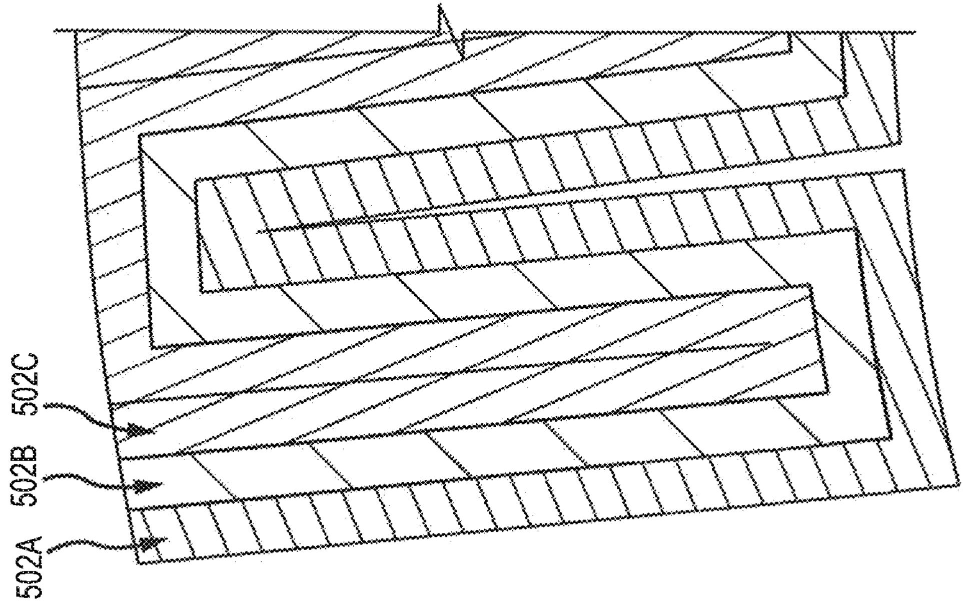

Referring now to FIG. 5, an exploded view of a portion of one quadrant of a nacelle inlet nested three-phase electrothermal heater 302 is illustrated, in accordance with various embodiments. In various embodiments, the heating elements 502A, 502B, and 502C are each individually associated with a respective phase A, B, or C of a three-phase power system, such as three-phase power system 404 of FIG. 4. As is illustrated, the heating elements 502A, 502B, and 502C are nested, such that the heating element 502A is adjacent to the heating element 502B and the heating element 502B is adjacent to the heating element 502C as they wind back and forth between the outer portion of the inlet cowl to the inner portion of the inlet cowl. In various embodiments, each of the heating elements 502A, 502B, and 502C provide a resistance that provides heat to reduce or prevent the collection of ice on the inlet cowl.

Figure 6:
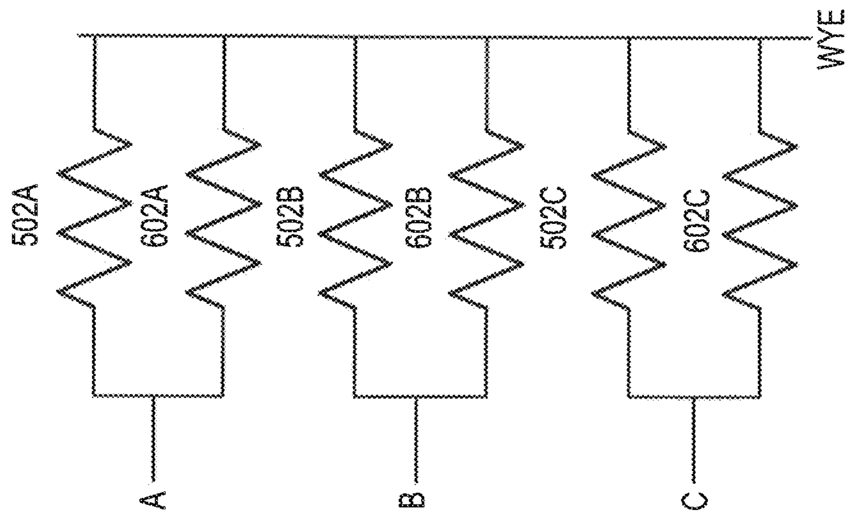
FIG. 6 illustrates an exploded view of a portion of one quadrant of a nacelle inlet nested three-phase electrothermal heater with a "split" three-phase power source, in accordance with various embodiments.
Figure 6:
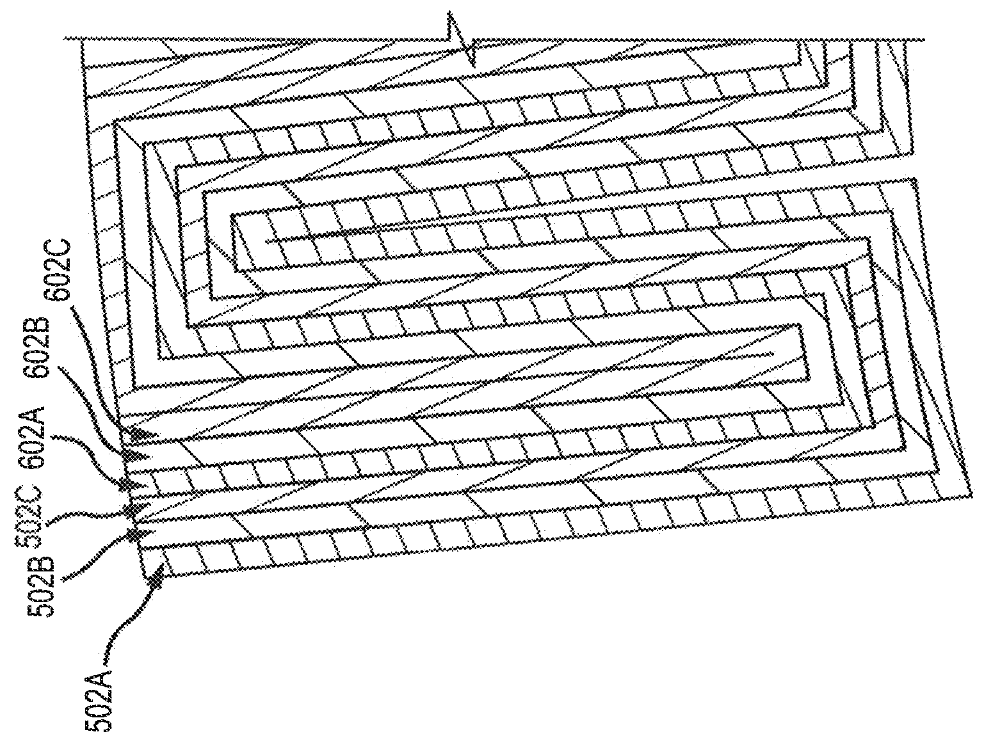

Referring now to FIG. 6, an exploded view of a portion of one quadrant of a nacelle inlet nested three-phase electrothermal heater 302 with a "split" three-phase power source is illustrated, in accordance with various embodiments. As is illustrated, in addition to heating elements 502A, 502B, and 502C, in various embodiments, a second set of heating elements 602A, 602B, and 602C may be included in the nacelle inlet nested three-phase electrothermal heater 302. In various embodiments, the heating elements 502A and 602A are associated with a respective phase A of a three-phase power system, such as three-phase power system 404 of FIG. 4. In various embodiments, the heating elements 502B and 602B are associated with a respective phase B of a three-phase power system, such as three-phase power system 404 of FIG. 4. In various embodiments, the heating elements 502C and 602C are associated with a respective phase C of a three-phase power system, such as three-phase power system 404 of FIG. 4. As is illustrated, the heating elements 502A, 502B, 502C, 602A, 602B, and 602C are nested, such that the heating element 502A is adjacent to the heating element 502B, the heating element 502B is adjacent to the heating element 502C, the heating element 502C is adjacent to the heating element 602A, the heating element 602A is adjacent to the heating element 602B, and the heating element 602B is adjacent to the heating element 602C as they wind back and forth between the outer portion of the inlet cowl to the inner portion of the inlet cowl. In various embodiments, each of the heating elements 502A, 502B, 502C, 602A, 602B, and 602C provide a resistance that provides heat to reduce or prevent the collection of ice on the inlet cowl.

Referring now to FIG. 7, an exploded view of a portion of one quadrant of a nacelle inlet nested three-phase electrothermal heater 302 with a "dual" three-phase power source is illustrated, in accordance with various embodiments. As is illustrated, in addition to heating elements 502A, 502B, and 502C, in various embodiments, a second set of heating elements 702A, 702B, and 702C may be included in the nacelle inlet nested three-phase electrothermal heater 302. In various embodiments, the heating elements 502A, 502B, and 502C are each individually associated with a respective phase A, B, or C of a primary three-phase power system, such as three-phase power system 404 of FIG. 4. In various embodiments, the heating elements 702A, 702B, and 702C are each individually associated with a respective phase A, B, or C of a secondary three-phase power system, such as a second three-phase power system 404 of FIG. 4, in order to provide redundancy. As is illustrated, the heating elements 502A, 702A, 502B, 702B, 502C, and 702C are nested, such that the heating element 502A is adjacent to the heating element 502B, the heating element 502B is adjacent to the heating element 502C, the heating element 502C is adjacent to the heating element 702A, the heating element 702A is adjacent to the heating element 702B, and the heating element 702B is adjacent to the heating element 702C as they wind back and forth between the outer portion of the inlet cowl to the inner portion of the inlet cowl. In various embodiments, each of the heating elements 502A, 702A, 502B, 702B, 502C, and 702C provide a resistance that provides heat to reduce or prevent the collection of ice on the inlet cowl.

Referring now to FIGS. 8, 9, 10, and 11, tables for three consecutive sets of time periods 802, 804 and 806, each set having a first predetermined time period, a second predetermined time period, and a third predetermined time period, under various conditions are illustrated, in accordance with various embodiments. As is illustrated in FIG. 8, under normal conditions with all heating elements operational, a controller, such as controller 408 of FIG. 4, controls the three-phase power system 404 such that, for each of the quadrants 302*a*, 302*b*, 302*c*, and 302*d* of the nacelle inlet nested three-phase electrothermal heater 302, only two of the three phases are on for each respective one of the first predetermined time period, the second predetermined time period, and the third predetermined time period for each of the three consecutive sets of time periods 802, 804 and 806. For example, with regard to quadrant A and in the time period 802, for the first predetermined time period in time period 802, phase A is off and phases B and C are on; for the second predetermined time period in time period 802, phase B is off and phases A and C are on; and for the third predetermined time period in time period 802, phase C is off and phases A and B are on. As is further illustrated, in accordance with various embodiments, each of phases A, B, and C in each of quadrants 302*a*, 302*b*, 302*c*, and 302*d* are configured to draw 2500 Watts. When summed over all the quadrants 302*a*, 302*b*, 302*c*, and 302*d*, the total power consumed by the phases with respect to the phases that are switched on and the phases that are switched off is the same thereby providing a balanced power system using pulse width modulation.

As is illustrated in FIG. 9, heating element associated with phase B in quadrant 302*b* has failed, the controller controls the three-phase power system 404 such that, for each of the quadrants 302*a*, 302*c*, and 302*d* of the nacelle inlet nested three-phase electrothermal heater 302, only two of the three phases are on for each respective one of the first predetermined time period, the second predetermined time period, and the third predetermined time period for each of the three consecutive sets of time periods 802, 804 and 806. However, with regard to quadrant 302*b*, because of the failure of the heating element associated with phase B, for each of the first predetermined time period, the second predetermined time period, and the third predetermined time period in time periods 802, 804, and 806, phase B is off and phases A and C are on. It should be noted, that in these examples, the total power consumed by the phases with respect to the phases that are switched on and the phases that are switched off still provides a balanced power system using pulse width modulation for each of the quadrants 302*a*, 302*c*, and 302*d* and the full-on power for phases A and C in quadrant 302*b*.

As is illustrated in FIG. 10, in addition to heating element associated with phase B in quadrant 302*b* failing, heating element associated with phase A in quadrant 302*a* has also failed. Accordingly, in various embodiments, the controller controls the three-phase power system 404 such that, for each of the quadrants 302*c* and 302*d* of the nacelle inlet nested three-phase electrothermal heater 302, only two of the three phases are on for each respective one of the first predetermined time period, the second predetermined time period, and the third predetermined time period for each of the three consecutive sets of time periods 802, 804 and 806. However, with regard to quadrants 302*a* and 302*b*, because of the failure of the heating element associated with phase B in quadrant 302*b* and the failure of the heating element associated with phase A in quadrant 302*a*, for each of the first predetermined time period, the second predetermined time period, and the third predetermined time period in time periods 802, 804, and 806, phase B is off and phases A and C are on in quadrant 302*b* and phase A is off and phases B and C are on in quadrant 302*a*. It should be noted, that in this examples, the total power consumed by the phases with respect to the phases that are switched on and the phases that are switched off still provides a balanced power system using pulse width modulation for each of the quadrants 302*c* and 302*d* and the full-on power for phases A and C in quadrant 302*b* and phases B and C in quadrant 302*a*.

As is illustrated in FIG. 11, in addition to heating elements associated with phase B in quadrant 302*b* and phase A in quadrant 302*a* has also failed, heating element associated with phase C in quadrant 302*c* has also failed. Accordingly, in various embodiments, the controller controls the three-phase power system 404 such that, for quadrant 302*d* of the nacelle inlet nested three-phase electrothermal heater 302, only two of the three phases are on for each respective one of the first predetermined time period, the second predetermined time period, and the third predetermined time period for each of the three consecutive sets of time periods 802, 804 and 806. However, with regard to quadrants 302*a*, 302*b*, and 302*c*, because of the failure of the heating element associated with phase B in quadrant 302*b*, the failure of the heating element associated with phase A in quadrant 302*a*, and the failure of the heating element associated with phase C in quadrant 302*c*, for each of the first predetermined time period, the second predetermined time period, and the third predetermined time period in time periods 802, 804, and 806, phase B is off and phases A and C are on in quadrant 302*b*, phase A is off and phases B and C are on in quadrant 302*a*, and phase C is off and phases A and B are on in quadrant 302*c*. It should be noted, that in this examples, the total power consumed by the phases with respect to the phases that are switched on and the phases that are switched off still provides a balanced power system using pulse width modulation for quadrants 302*d* and the full-on power for phases A and C in quadrant 302*b*, phases B and C in quadrant 302*a*, and phases A and B in quadrant 302*c*.

Thus, the nacelle inlet nested three-phase electrothermal heater of the illustrative embodiments provides for improved dispatch reliability by allowing the system to achieve full anti-ice capability response to a heating element of the nacelle inlet nested three-phase electrothermal heater failing. Moreover, the above-described nacelle inlet nested three-phase electrothermal heater system provides a minimal weight penalty when compared to other redundant heater solutions.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A nested three-phase heater for an aircraft part, the nested three-phase heater comprising:

a three-phase power supply;

a set of three heating elements, each heating element of the set of three heating elements coupled to a respective phase of the three-phase power supply;

a controller coupled to the three-phase power supply and the set of three heating elements and configured to control each of the phases of the three-phase power supply, wherein the controller is configured to, responsive to all heating elements of the set of three heating elements being operational, switch the phases such that:

for a first predetermined time period, activate and provide power from a first phase and a second phase of the three-phase power supply to a first heating element and a second heating element of the set of three heating elements, respectively;

for a second predetermined time period, activate and provide power from the second phase and a third phase of the three-phase power supply to the second heating element and a third heating element of the set of three heating elements, respectively; and for a third predetermined time period, activate and provide power from the first phase and the third phase of the three-phase power supply to the first heating element and the third heating element of the set of three heating elements, respectively.

2. The nested three-phase heater of claim 1, wherein the controller is further configured to:

responsive to at least one of one heating element of the set of three heating elements failing, a phase of the three-phase power supply supplying power to the one heating element failing, or wiring between the three-phase power supply and the one heating element failing, activate and provide power from respective phases of the three-phase power supply to the other two heating elements of the set of three heating elements.

3. The nested three-phase heater of claim 1, wherein the aircraft part is an inlet cowl.

4. The nested three-phase heater of claim 3, wherein the nested three-phase heater is coupled to the inlet cowl.

5. The nested three-phase heater of claim 4, wherein the nested three-phase heater is coupled to the inlet cowl, extending an outward distance from a leading edge of the inlet cowl outward along an outer portion of the inlet cowl and extending an inner distance from the leading edge of the inlet cowl inward along an inner portion of the inlet cowl.

6. The nested three-phase heater of claim 5, wherein the set of three heating elements wind back and forth between the outer portion of the inlet cowl to the inner portion of the inlet cowl.

7. The nested three-phase heater of claim 1, wherein, in the nested three-phase heater, the first heating element is adjacent the second heating element, and the second heating element is adjacent the third heating element.

8. The nested three-phase heater of claim 1, wherein the nested three-phase heater is a first three-phase electrothermal heater and the set of three heating elements is a first set of three heating elements and wherein the nested three-phase heater further comprises:

a second three-phase electrothermal heater comprising a second set of three heating elements coupled to the aircraft part, each heating element of the second set of three heating elements coupled to a respective phase of the three-phase power supply, wherein the controller is configured to, responsive to all heating elements of the second set of three heating elements being operational, switch the phases such that:

for the first predetermined time period, activate and provide power from the first phase and the second phase of the three-phase power supply to a first heating element and a second heating element of the second set of three heating elements, respectively;

for the second predetermined time period, activate and provide power from the second phase and the third phase of the three-phase power supply to the second heating element and a third heating element of the second set of three heating elements, respectively; and for the third predetermined time period, activate and provide power from the first phase and the third phase of the three-phase power supply to the first heating element and the third heating element of the second set of three heating elements, respectively.

9. The nested three-phase heater of claim 8, wherein the second three-phase electrothermal heater is nested within the first three-phase electrothermal heater such that the third heating element of the first three-phase electrothermal heater is adjacent the first heating element of the second three-phase electrothermal heater, the first heating element of the second three-phase electrothermal heater is adjacent the second heating element of the second three-phase electrothermal heater, and the second heating element of the second three-phase electrothermal heater is adjacent the third heating element of the second three-phase electrothermal heater.

10. The nested three-phase heater of claim 8, wherein the three-phase power supply is a first three-phase power supply and wherein the nested three-phase heater further comprises:

a second three-phase power supply, wherein the second three-phase electrothermal heater is coupled to the second three-phase power supply, wherein the second three-phase electrothermal heater is nested within the first three-phase electrothermal heater such that the first heating element of the first three-phase electrothermal heater is adjacent the first heating element of the second three-phase electrothermal heater, the second heating element of the first three-phase electrothermal heater is adjacent the first heating element of the second three-phase electrothermal heater, the second heating element of the second three-phase electrothermal heater is adjacent the second heating element of the first three-phase electrothermal heater, the third heating element of the first three-phase electrothermal heater is adjacent the second heating element of the second three-phase electrothermal heater, and the third heating element of the second three-phase electrothermal heater is adjacent the third heating element of the first three-phase electrothermal heater.

11. A system, the system comprising:

a surface of an aircraft;

a three-phase power supply;

a nested three-phase heater coupled to the surface of the aircraft and comprising a set of three heating elements, each heating element of the set of three heating elements coupled to a respective phase of the three-phase power supply; and a controller, the controller coupled to the three-phase power supply and the nested three-phase heater and configured to control each of the phases of the three-phase power supply, wherein the controller is configured to, responsive to all heating elements of the set of three heating elements being operational, switch the phases such that:

for a first predetermined time period, activate and provide power from a first phase and a second phase of the three-phase power supply to a first heating element and a second heating element of the set of three heating elements, respectively;

for a second predetermined time period, activate and provide power from the second phase and a third phase of the three-phase power supply to the second heating element and a third heating element of the set of three heating elements, respectively; and for a third predetermined time period, activate and provide power from the first phase and the third phase of the three-phase power supply to the first heating element and the third heating element of the set of three heating elements, respectively.

12. The system of claim 11, wherein the controller is further configured to:

responsive to at least one of one heating element of the set of three heating elements failing, a phase of the three-phase power supply supplying power to the one heating element failing, or wiring between the three-phase power supply and the one heating element failing, activate and provide power from respective phases of the three-phase power supply to the other two heating elements of the set of three heating elements.

13. The system of claim 11, wherein the surface of the aircraft comprises an inlet cowl and wherein the nested three-phase heater is coupled to the inlet cowl.

14. The system of claim 13, wherein the nested three-phase heater is coupled to the inlet cowl, extending an outward distance from a leading edge of the inlet cowl outward along an outer portion of the inlet cowl and extending an inner distance from the leading edge of the inlet cowl inward along an inner portion of the inlet cowl.

15. The system of claim 14, wherein the set of three heating elements wind back and forth between the outer portion of the inlet cowl to the inner portion of the inlet cowl.

16. The system of claim 11, wherein, in the nested three-phase heater, the first heating element is adjacent the second heating element and the second heating element is adjacent the third heating element.

17. The system of claim 11, wherein the nested three-phase heater is a first three-phase electrothermal heater and the set of three heating elements is a first set of three heating elements and wherein the system further comprises:

a second three-phase electrothermal heater comprising a second set of three heating elements coupled to the surface of the aircraft, each heating element of the second set of three heating elements coupled to a respective phase of the three-phase power supply.

18. The system of claim 17, wherein the controller is configured to, responsive to all heating elements of the second set of three heating elements being operational, switch the phases such that:

for the first predetermined time period, activate and provide power from the first phase and the second phase of the three-phase power supply to a first heating element and a second heating element of the second set of three heating elements, respectively;

for the second predetermined time period, activate and provide power from the second phase and the third phase of the three-phase power supply to the second heating element and a third heating element of the second set of three heating elements, respectively; and for the third predetermined time period, activate and provide power from the first phase and the third phase of the three-phase power supply to the first heating element and the third heating element of the second set of three heating elements, respectively.

19. The system of claim 18, wherein the second three-phase electrothermal heater is nested within the first three-phase electrothermal heater such that the third heating element of the first three-phase electrothermal heater is adjacent the first heating element of the second three-phase electrothermal heater, the first heating element of the second three-phase electrothermal heater is adjacent the second heating element of the second three-phase electrothermal heater, and the second heating element of the second three-phase electrothermal heater is adjacent the third heating element of the second three-phase electrothermal heater.

20. The system of claim 18, wherein the three-phase power supply is a first three-phase power supply and wherein the system further comprises:

a second three-phase power supply, wherein the second three-phase electrothermal heater is coupled to the second three-phase power supply, wherein the second three-phase electrothermal heater is nested within the first three-phase electrothermal heater such that the first heating element of the first three-phase electrothermal heater is adjacent the first heating element of the second three-phase electrothermal heater, the second heating element of the first three-phase electrothermal heater is adjacent the first heating element of the second three-phase electrothermal heater, the second heating element of the second three-phase electrothermal heater is adjacent the second heating element of the first three-phase electrothermal heater, the third heating element of the first three-phase electrothermal heater is adjacent the second heating element of the second three-phase electrothermal heater, and the third heating element of the second three-phase electrothermal heater is adjacent the third heating element of the first three-phase electrothermal heater.

* * * * *